(12) United States Patent
Chang (10) Patent No.: US 10,479,027 B1
(45) Date of Patent: Nov. 19, 2019

(54) EDGE BANDING MACHINE CAPABLE OF REDUCING PROCESSING ERROR

(71) Applicant: OAV EQUIPMENT AND TOOLS, INC., Taichung (TW)

(72) Inventor: Yen-Tsung Chang, Taichung (TW)

(73) Assignee: OAV EQUIPMENT AND TOOLS, INC., Taichung (TW)

( * ) Notice: Subject to any disclaimer, the term of this patent is extended or adjusted under 35 U.S.C. 154(b) by 0 days.

(21) Appl. No.: 16/379,070

(22) Filed: Apr. 9, 2019

(30) Foreign Application Priority Data

Oct. 19, 2018 (TW) .............................. 107136878 A (51) Int. Cl.
| | | |
|---|---|---|
| *B32B 37/00* | (2006.01) | |
| *B29C 65/00* | (2006.01) | |
| *B26D 1/24* | (2006.01) | |
| *B29C 65/52* | (2006.01) | |

(52) U.S. Cl.
CPC ............... *B29C 66/80* (2013.01); *B26D 1/24* (2013.01); *B29C 65/524* (2013.01); *B29C 2793/0072* (2013.01)

(58) Field of Classification Search
CPC .......... B29C 66/80; B29C 65/524; B26D 1/24

USPC ........................................................ 156/580
See application file for complete search history.

(56) References Cited

U.S. PATENT DOCUMENTS

| | | | | |
|---|---|---|---|---|
| 5,149,393 A | * | 9/1992 | Hutchinson | ........... B29C 65/229 |
| | | | | 156/555 |
| 8,726,960 B1 | * | 5/2014 | Huang | .................. B29C 66/836 |
| | | | | 156/359 |
| 9,499,289 B1 | * | 11/2016 | Uttaro | ................... B65B 51/306 |

FOREIGN PATENT DOCUMENTS

| | | |
|---|---|---|
| CN | 101549509 A | 10/2009 |
| CN | 1650061 B | 9/2010 |
| TW | M559851 B | 5/2018 |

* cited by examiner

*Primary Examiner* — James D Sells
(74) *Attorney, Agent, or Firm* — Muncy, Geissler, Olds & Lowe, P.C.

(57) ABSTRACT

An edge banding machine, which is adapted for processing a workpiece, includes a base, a slide rail, a positioning pressing wheel set and a pre-milling mechanism. The base has a slide installation seat having an first outer wall and an second outer wall arranged parallel to each other. The slide rail is movably disposed on the slide installation seat. The positioning pressing wheel set is spacedly disposed above the slide rail and the slide rail are arranged apart for clamping the workpiece therebetween. The pre-milling mechanism is fixed to the second outer wall.

10 Claims, 9 Drawing Sheets

EDGE BANDING MACHINE CAPABLE OF REDUCING PROCESSING ERROR

BACKGROUND OF THE INVENTION

1. Field of the Invention

The present invention relates to an edge banding machine and more particularly, to an edge banding machine which is provided with components fixed to a side of a base to reduce processing error.

2. Description of the Related Art

Taiwan Patent No. M559851 disclosed the structure of an edge banding machine. The edge banding machine 1 structurally includes a platform 10, a feeding mechanism 20, a glue applying mechanism 30, an edge band conveying mechanism 50 and a positioning pressing wheel set (not shown). The feeding mechanism 20 is disposed on a side of the platform 10. The glue applying mechanism 30 and the edge band conveying mechanism 50 are both disposed on the platform 10. A workpiece S is disposed between the positioning pressing wheel set and the feeding mechanism 20. When the workpiece S is conveyed by the feeding mechanism 20 to pass by the glue applying mechanism 30, a lateral surface of the workpiece S is applied with glue. After that, the edge band conveying mechanism 50 conveys an edge band B to cause the edge band B to be bonded to the lateral surface of the workpiece S by the aforesaid glue.

However, the above-mentioned components of the edge banding machine 1 are fixed on a bottom seat (not shown) below the platform rather than directly fixed on the side of the feeding mechanism 20. In some cases, when the workpiece to be processed S is quite large in size and the workpiece S mostly protrudes out of the feeding mechanism 20 to cause the center of gravity of the workpiece S located outside the feeding mechanism 20, the workpiece S together with the feeding mechanism 20 may rotate downward a little bit, disabling the edge band B to be accurately and correctly bonded to the lateral surface of the workpiece S, thereby causing processing error and affecting the yield rate.

SUMMARY OF THE INVENTION

Therefore, it is one of the objectives of the present invention to provide an edge banding machine with a brand-new configuration design, which can reduce the error in the edge banding process.

According to an embodiment provided by the present invention, an edge banding machine, which is adapted for processing a workpiece, includes a base, a slide rail, a positioning pressing wheel set, and a pre-milling mechanism. The base has a slide installation seat. The aforesaid slide installation seat has an first outer wall and an second outer wall which are arranged parallel to each other, and the slide installation seat has a feed inlet end and a feed outlet end. Besides, the aforesaid slide rail is movably disposed on the slide installation seat from the feed inlet end to the feed outlet end. The aforesaid positioning pressing wheel set is spacedly disposed above the slide rail and presses and the workpiece toward the slide rail in such a way that the workpiece can be moved the positioning pressing wheel set and the slide rail and along with the slide rail. The aforesaid pre-milling mechanism is fixed to the aforesaid second outer wall and located close to the feed inlet end and far from the feed outlet end.

As a result, when the size of the workpiece is so large as to cause the workpiece mostly protrude out of the slide rail and the center of gravity of the workpiece located outside the slide rail, the workpiece together with the slide rail, the slide installation seat and the pre-milling mechanism will offset a little bit synchronously because the whole pre-milling mechanism is fixed to the second outer wall of the slide installation seat, thereby reducing the inaccuracy of the position of the workpiece relative to the pre-milling mechanism to increase the overall processing yield rate.

In an aspect, said base further includes a bottom seat; the aforesaid slide installation seat is disposed on the bottom seat; the aforesaid bottom seat has a lateral surface and the aforesaid lateral surface is flush with an outer surface of the aforesaid first outer wall.

In another aspect, said slide installation seat is hollow-shaped and has an accommodating space; said slide installation seat further includes a top opening; said top opening is provided between said second outer wall and said first outer wall and communicates with said accommodating space. The configuration design of the aforesaid slide installation seat is convenient for the installation of the slide rail and adapted for a chain for driving the slide rail to be disposed in the accommodating space.

In another aspect, said slide rail includes a plurality of bearing units; each of the bearing units bridges the top sides of the second outer wall and the first outer wall, so that the bearing units can convey the workpiece stably.

In another aspect, the aforesaid pre-milling mechanism includes a first fixed rack and a cutting wheel; the aforesaid first fixed rack is fixed to the aforesaid second outer wall, and the aforesaid cutting wheel is rotatably disposed on the aforesaid first fixed rack, so that the pre-milling mechanism can be mounted to the second outer wall firmly.

In another aspect, said first fixed rack has a connecting plate and a fixed seat; said fixed seat is threadedly fastened to said connecting plate, and said cutting wheel is rotatably disposed on said fixed seat, so that said cutting wheel is fixed relatively more firmly.

In another aspect, said cutting wheel has a rotary shaft, and said pre-milling mechanism further includes a first motor and a transmission belt; said first motor has an outputting shaft; said transmission belt connects said rotary shaft of said cutting wheel and said outputting shaft of said first motor.

In another aspect, the edge banding machine further includes a horizontal pressing wheel set; the aforesaid horizontal pressing wheel set includes a second fixed rack and a front horizontal pressing wheel; the aforesaid second fixed rack is fixed to the aforesaid second outer wall, and the aforesaid front horizontal pressing wheel is rotatably disposed on the aforesaid second fixed rack, so that said horizontal pressing wheel set can be fixed to the second outer wall firmly.

In another aspect, said horizontal pressing wheel set includes a rear horizontal pressing wheel and two fixed seats, wherein said front and rear horizontal pressing wheels are rotatably disposed on said two fixed seats respectively, and said two fixed seats are disposed on said second fixed rack.

In another aspect, the edge banding machine further includes a bottom trimming mechanism; the aforesaid bottom trimming mechanism includes a third fixed rack, a second motor and a trimming cutter, wherein said bottom trimming mechanism is located between said horizontal pressing wheel set and said feed outlet end; said third fixed rack is fixed to said second outer wall; said second motor is fixed to said third fixed rack and has an outputting shaft; said trimming cutter is rotatably disposed on said outputting shaft.

BRIEF DESCRIPTION OF THE DRAWINGS

The detailed structure, features, assembling or using manner of the edge banding machine will be specified in the embodiment given hereinafter. However, it should be understood that the detailed description of the following embodiment and the accompanying drawings are given for illustration only, not for limiting the scope of the present invention, and wherein.

DETAILED DESCRIPTION OF THE INVENTION

The technique and features of the present invention will be detailedly specified in the instanced embodiment given herein below and the accompanying drawings. The directional terms mentioned in the following embodiment, such as 'above', 'downward', 'inside', 'outside', 'top' and 'bottom', are just for illustrative description on the basis of normal usage direction, not intended to limit the claimed scope.

For the detailed description of the technical features of the present invention, an illustrative embodiment and the accompanying drawings are given herein below.

Figure 1:
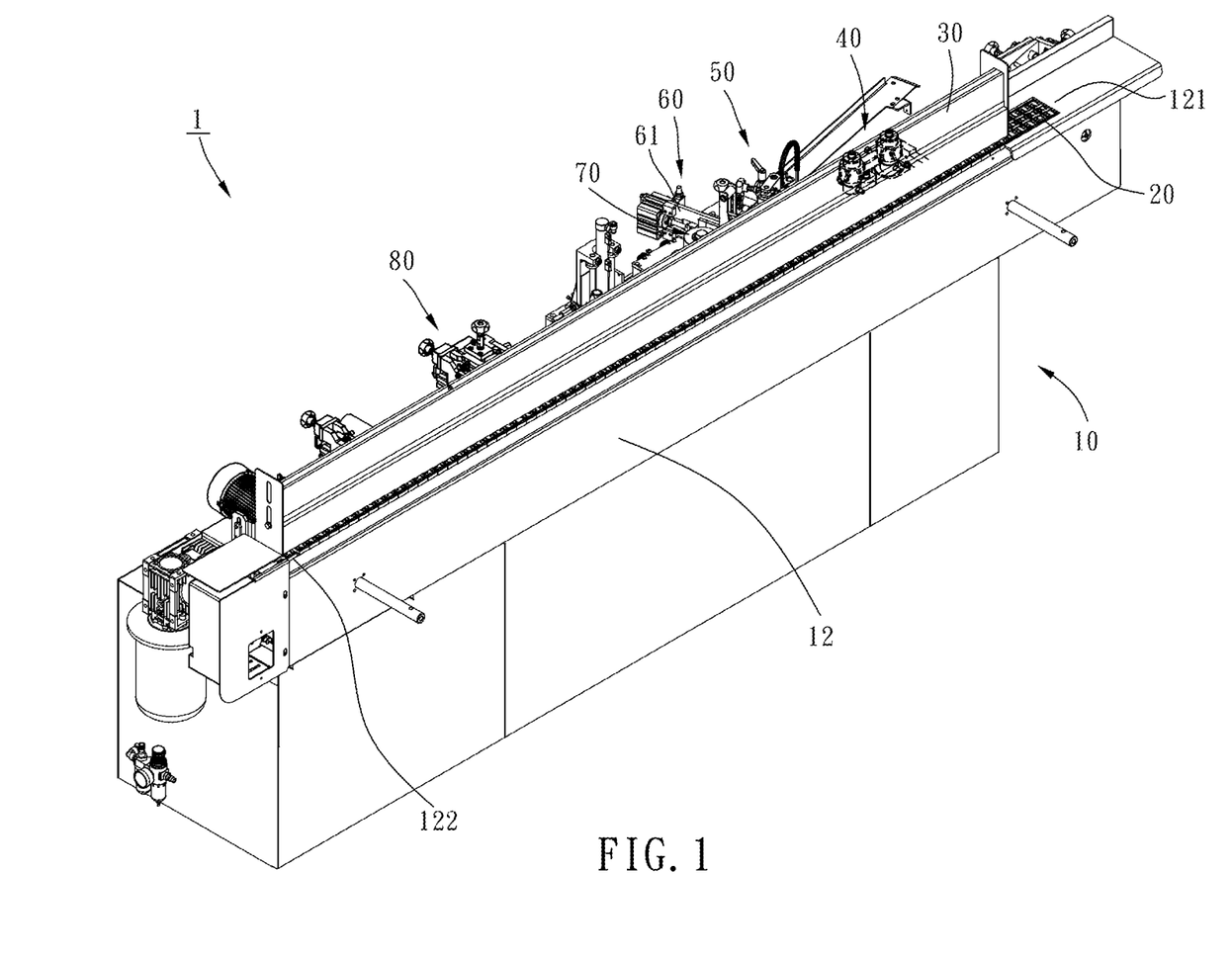
FIG. 1 is a perspective view of an edge banding machine of an illustrative embodiment.

As shown in FIG. 1, an edge banding machine 1 provided in the embodiment includes a base 10, a slide rail 20, a positioning pressing wheel set 30, and a plurality of mechanisms including a pre-milling mechanism 40, a glue applying mechanism 50, an edge band conveying mechanism 60, a horizontal pressing wheel set 70 and a bottom trimming mechanism 80.

Figure 2:
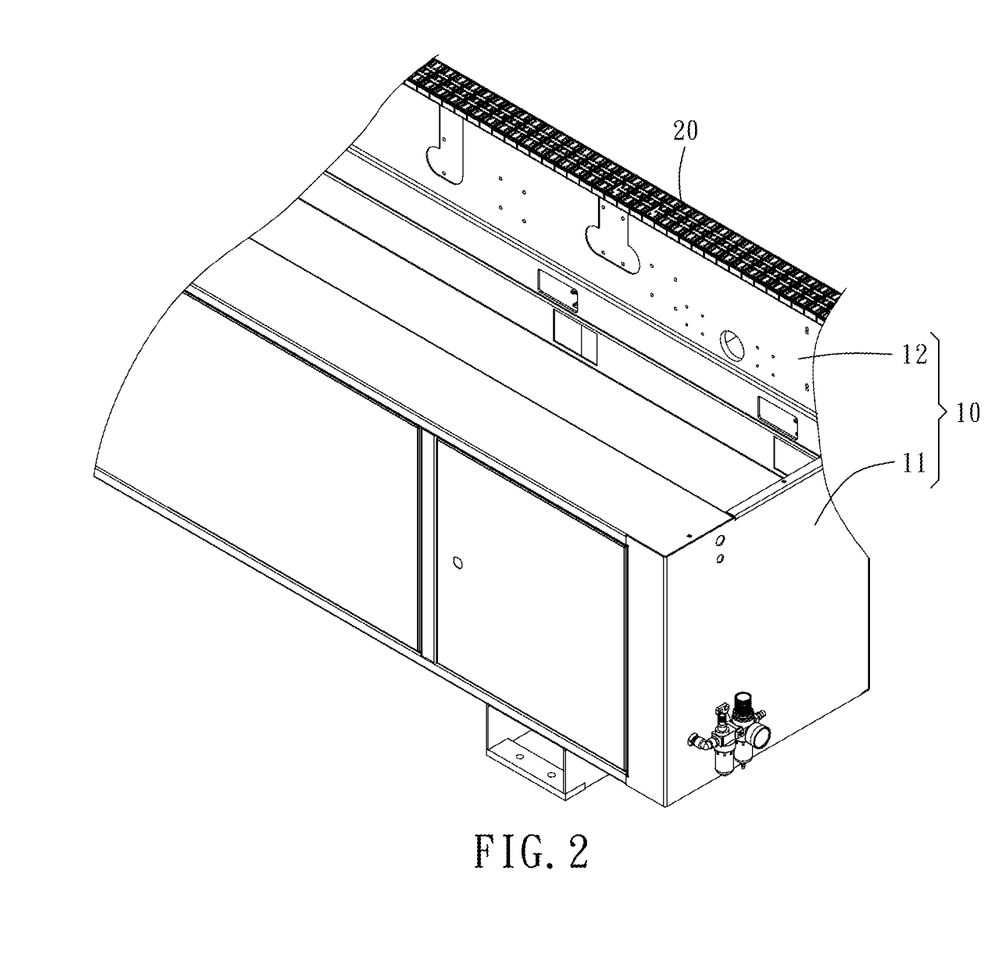
FIG. 2 is a partial perspective view of the edge banding machine of the illustrative embodiment for showing a base.
Figure 3:
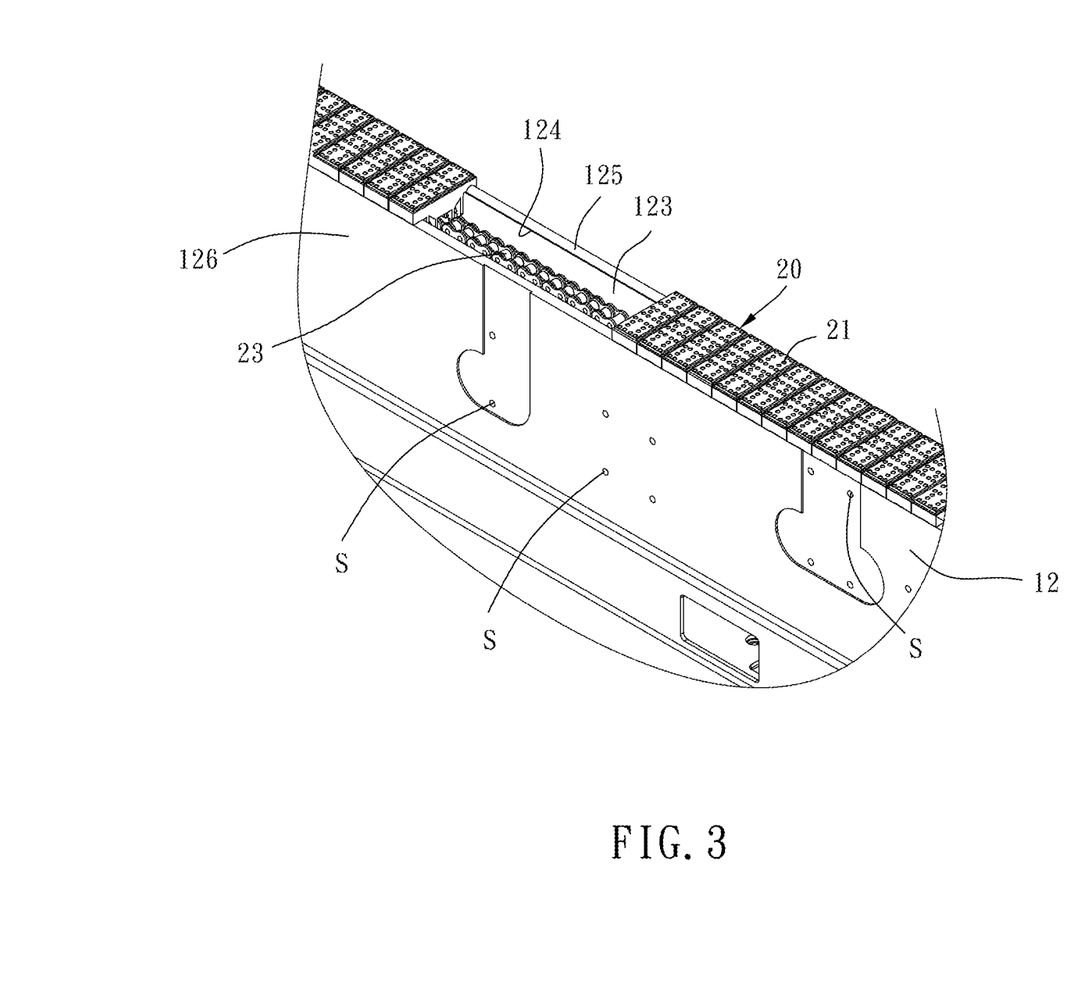
FIG. 3 is an enlarged view of a part of FIG. 2, and parts of bearing units of a slide rail are omitted in FIG. 3.
Figure 9:
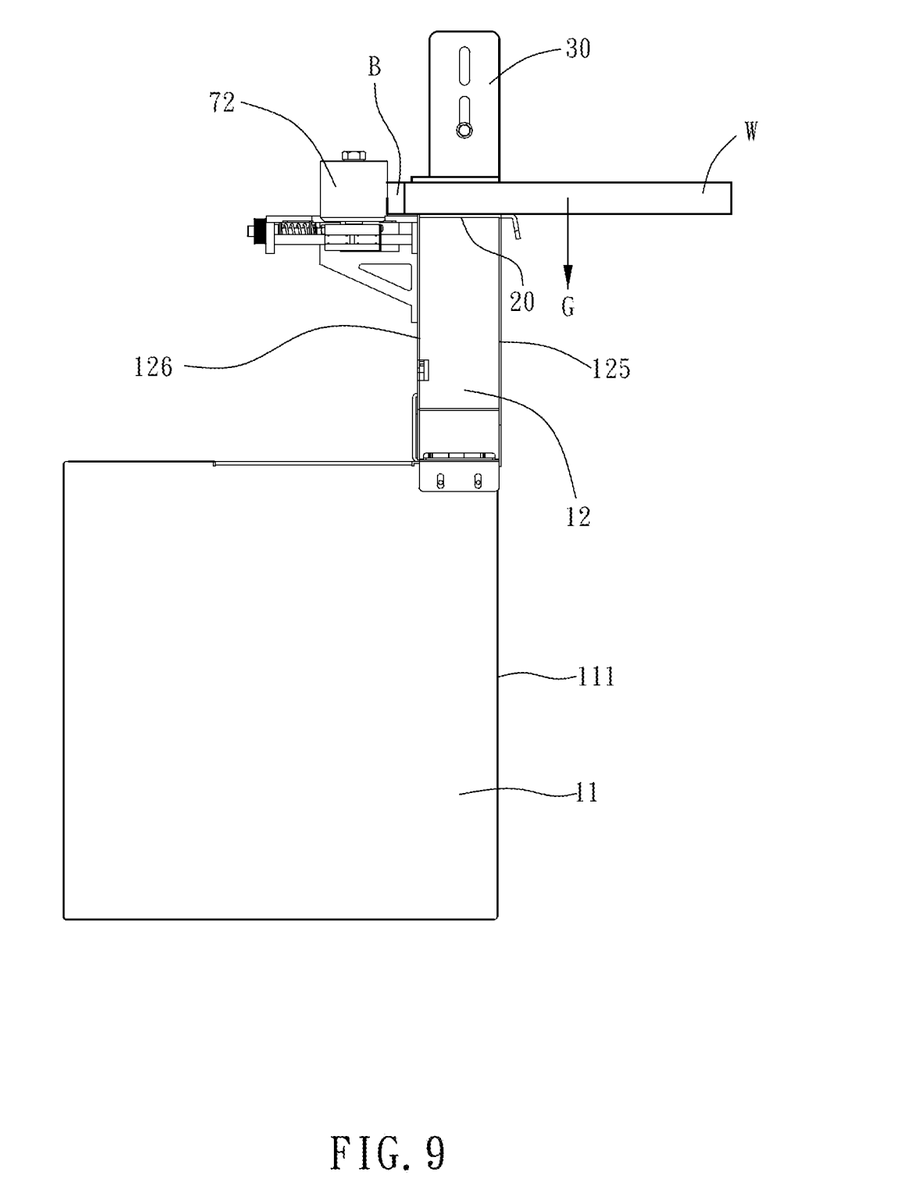
FIG. 9 is a lateral view of the edge banding machine of the illustrative embodiment.

Referring to FIGS. 1-3, the base 10 includes a bottom seat 11, and a slide installation seat 12 disposed on the bottom seat 11. The base 10 is hollow-shaped and provided therein with a PLC (programmable logic controller) control mechanism (not shown) for controlling the above-mentioned a plurality of mechanisms. The slide installation seat 12 is hollow-shaped, provided therein with an accommodating space 123, and has a feed inlet end 121 and a feed outlet end 122. The slide installation seat 12 structurally includes a top opening 124, and an first outer wall 125 and an second outer wall 126 which are arranged parallel to each other. The accommodating space 123 is located between the first outer wall 125 and the second outer wall 126. The top opening 124 communicates with the accommodating space 123. The second outer wall 126 is provided with a plurality of threaded holes S at appropriate positions. Besides, the bottom seat 11 has a lateral surface 111 which is flush with the outer surface of the first outer wall 125, as shown in FIG. 9.

The slide rail 20 is movably disposed on the slide installation seat 12 from the feed inlet end 121 to the feed outlet end 122, and structurally includes a plurality of bearing units 21, a transmission motor (not shown) and a chain 23. Each of the bearing units 21 bridges the top sides of the second outer wall 126 and the first outer wall 125. The chain 23 connects the bottom side of each bearing unit 21 and the transmission motor. The transmission motor in operation can move each bearing unit 21 by pulling the chain 23, thereby conveying a workpiece to be processed W in a way that the workpiece to be processed W is moved along with the movement of the slide rail 20 to pass by the pre-milling mechanism 40, the glue applying mechanism 50, the edge band conveying mechanism 60, the horizontal pressing wheel set 70 and the bottom trimming mechanism 80 in order, so that each process can be performed to the workpiece to be processed W.

Figure 4:
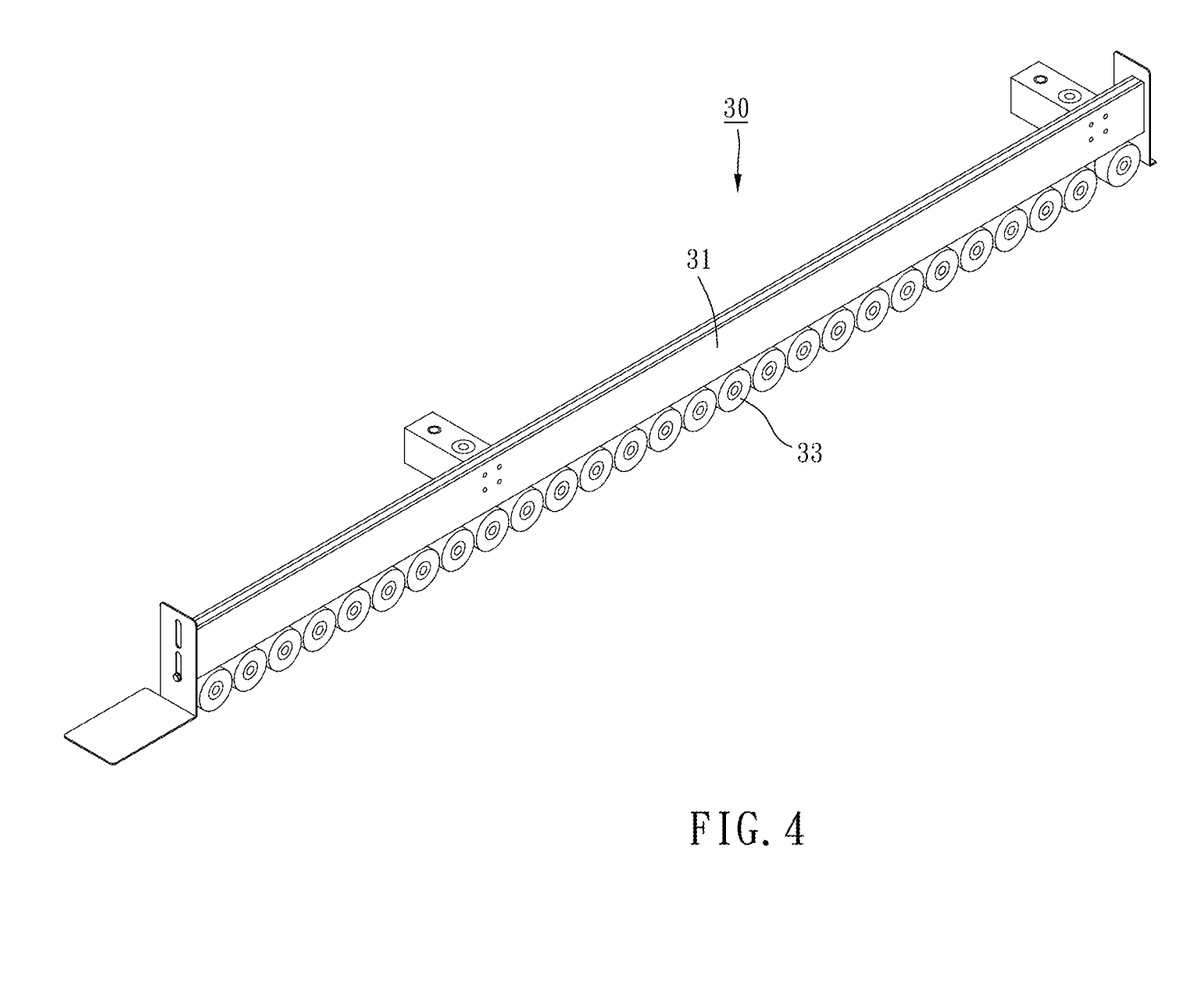
FIG. 4 is a perspective view of a positioning pressing wheel set of the illustrative embodiment.

Referring to FIGS. 1 and 4, the positioning pressing wheel set 30 is spacedly disposed above the slide rail 20. The positioning pressing wheel set 30 includes a top rack 31 and a plurality of pressing wheels 33. The top rack 31 is fixed to the base 10. Each of the pressing wheels 33 is rotatably disposed on the top rack 31 in a way that the workpiece to be processed W can be pressed toward the slide rail 20 and moved between the positioning pressing wheel set 30 and the slide rail 20 and moved along with the slide rail 20, as shown in FIG. 9.

Referring to FIG. 1, from the feed inlet end 121 to the feed outlet end 122, the glue applying mechanism 50 and the edge band conveying mechanism 60 are disposed on the bottom seat 11, and the pre-milling mechanism 40, the horizontal pressing wheel set 70 and the bottom trimming mechanism 80 are directly fixed to the second outer wall 126 of the slide installation seat 12.

Figure 5:
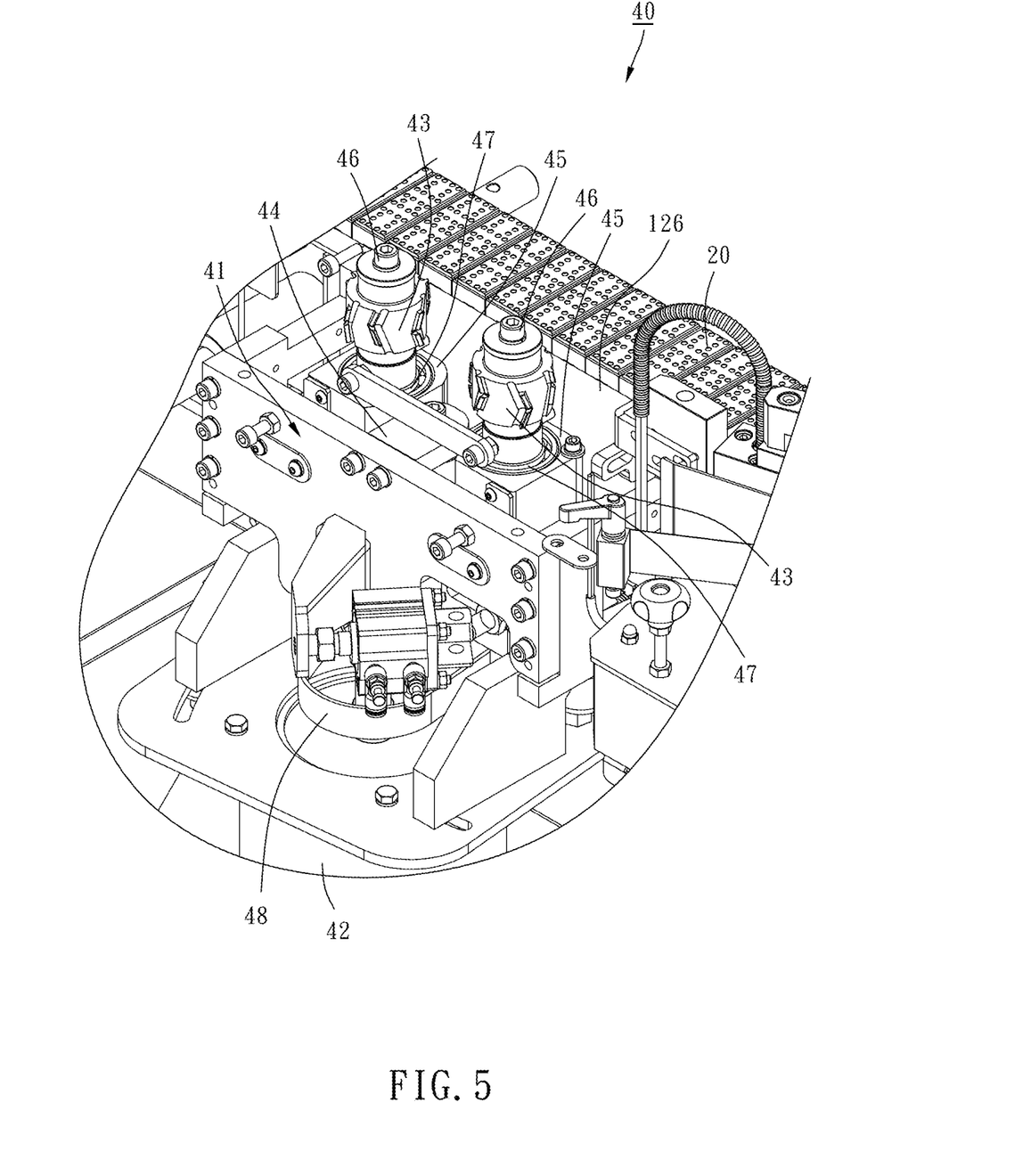
FIG. 5 is a partial perspective view of the edge banding machine of the illustrative embodiment for illustrating the installation condition of a pre-milling mechanism and a slide installation seat.

As shown in FIG. 5, the pre-milling mechanism 40 includes a first fixed rack 41, a first motor 42 and two cutting wheels 43. The first fixed rack 41 is roughly U-shaped and threadedly fastened to the second outer wall 126 by screws. The pre-milling mechanism 40 is located relatively close to the feed inlet end 121 and far from the feed outlet end 122. The first fixed rack 41 further has a connecting plate 44 and a set of fixed seats 45. The fixed seats 45 are threadedly fastened to the connecting plate 44. Each of the cutting wheels 43 has a rotary shaft 46, onto which a bearing 47 is sleeved. Through the bearings 47, the aforesaid two cutting wheels 43 are rotatably and separately disposed on the set of fixed seats 45. The first motor 42 has an outputting shaft (hidden by a transmission belt 48). The outputting shaft is connected with the rotary shafts 46 of the aforesaid two cutting wheels 43 through the transmission belt 48, so that the first motor 42 can drive the two cutting wheels 43 to rotate synchronously. Before the workpiece to be processed W is applied with glue, a lateral surface of the workpiece W is pre-trimmed when the workpiece W passes by the pre-milling mechanism 40, so that the workpiece W after the pre-trimming process has a specific width.

Referring to FIG. 1, when the workpiece W after the pre-trimming process is conveyed to the glue applying mechanism 50 by the slide rail 20, the lateral surface of the workpiece W is applied with glue by the glue applying mechanism 50. The workpiece W applied with the glue is conveyed to the edge band conveying mechanism 60. The edge band conveying mechanism 60 conveys an edge band B (as shown in FIG. 9) with a predetermined length and cuts off the aforesaid edge band B by a knife 61, to enable the edge band B with the aforesaid predetermined length to be tightly boned to the glue-applied lateral surface of the workpiece W by the horizontal pressing wheel set 70 in the follow-up process.

Figure 6:
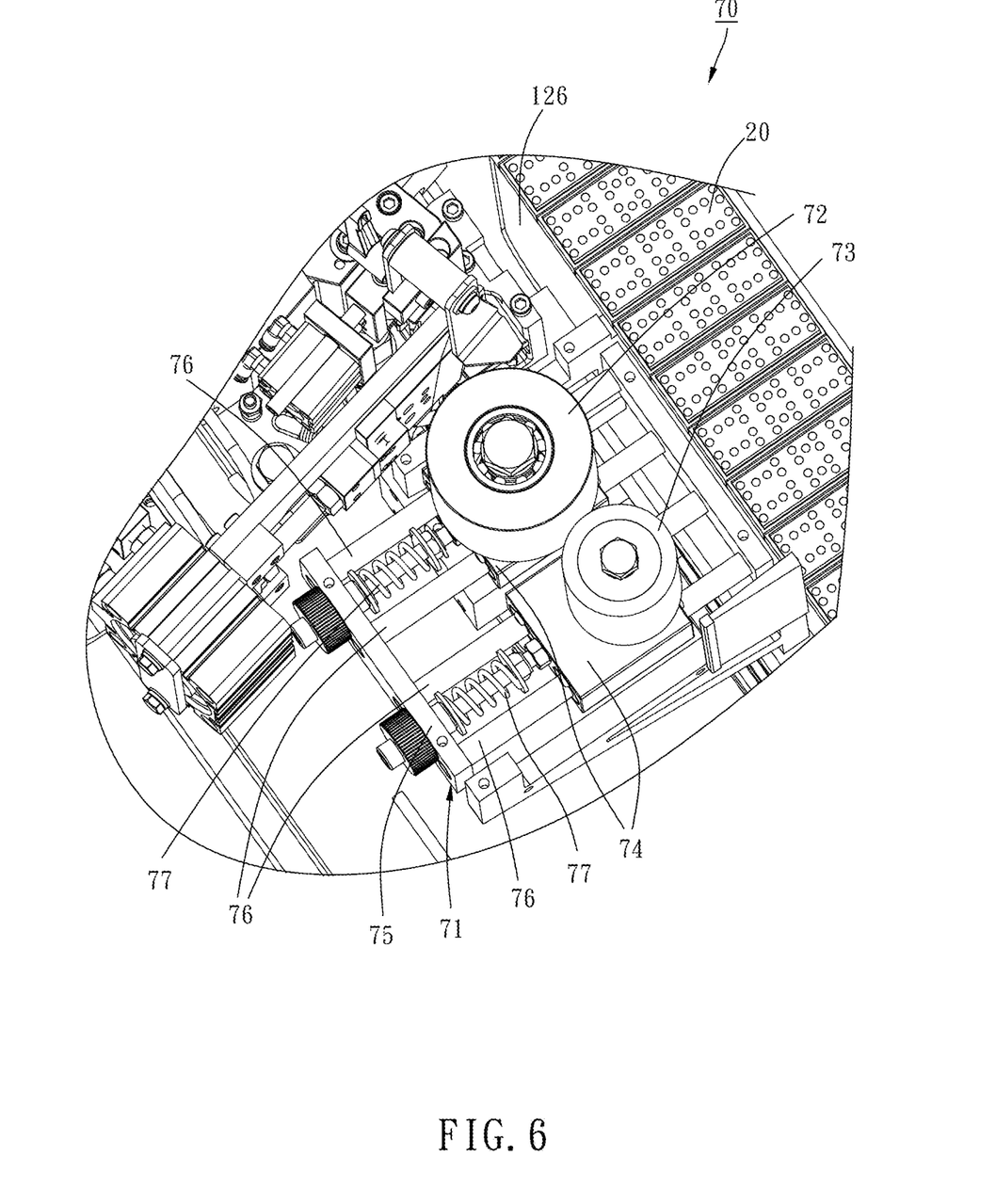
FIG. 6 is a partial perspective view of the edge banding machine of the illustrative embodiment for illustrating the installation condition of a horizontal pressing wheel set and the slide installation seat.

Referring to FIG. 6, the horizontal pressing wheel set 70 includes a second fixed rack 71, a front horizontal pressing wheel 72, a rear horizontal pressing wheel 73, and two fixed seats 74. The second fixed rack 71 is threadedly fastened to the second outer wall 126 by screws. The second fixed rack 71 has two straight plates 75 and four connecting rods 76. Each connecting rod 76 perpendicularly connects the second outer wall 126 by one of the straight plates 75. The front and rear horizontal pressing wheels 72 and 73 are rotatably disposed on the fixed seats 74. Each of the fixed seats 74 is sleeved onto two of the aforesaid connecting rods 76. Besides, there is a compressed spring 77 disposed between each fixed seat 74 and one of the straight plates 75. The horizontal pressing wheel set 70 can press the edge band B to be tightly boned to the lateral surface of the workpiece W.

Figure 7:
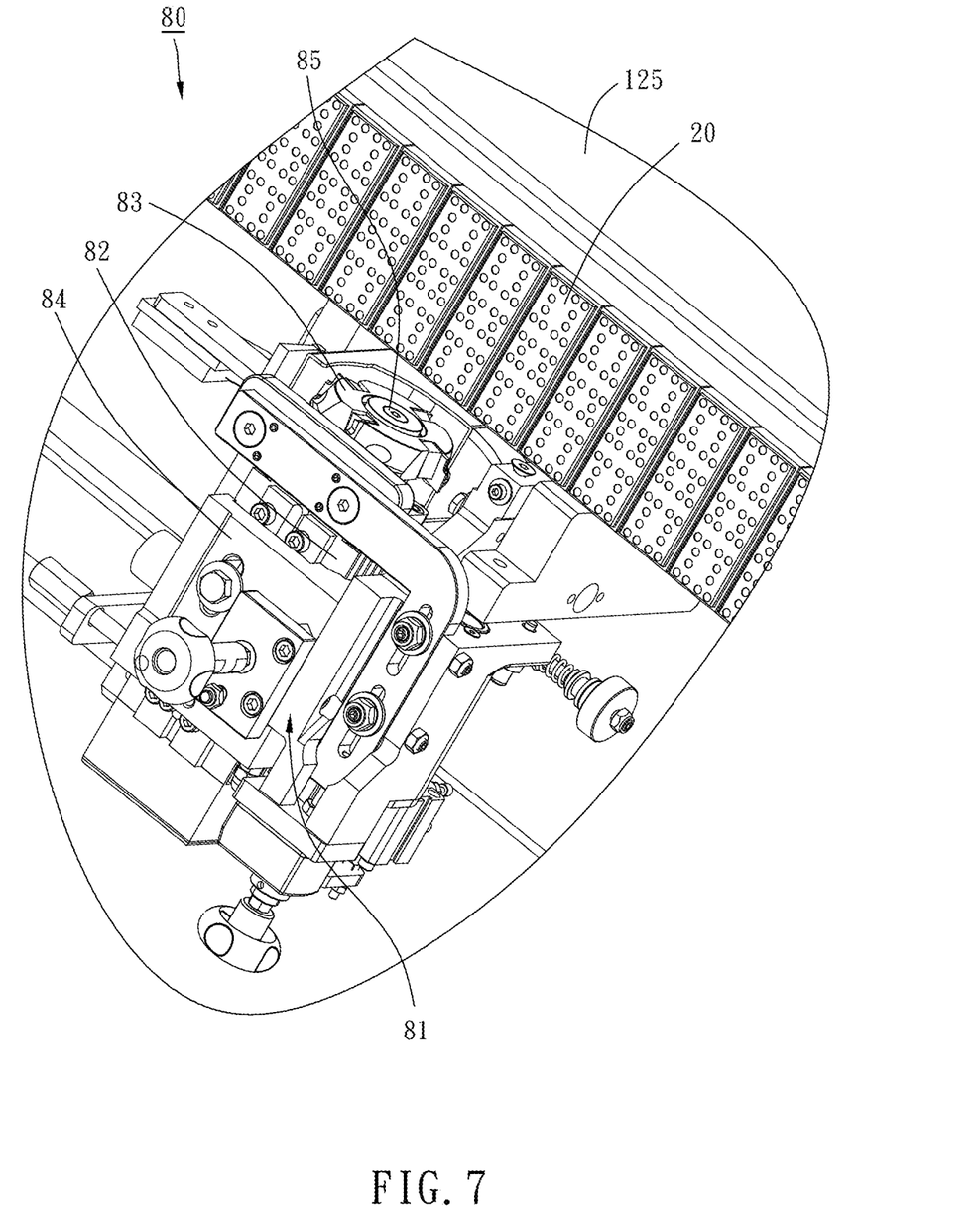
FIGS. 7 and 8 are partial perspective views of the edge banding machine of the illustrative embodiment for illustrating the installation condition of a bottom trimming mechanism and the slide installation seat.
Figure 8:
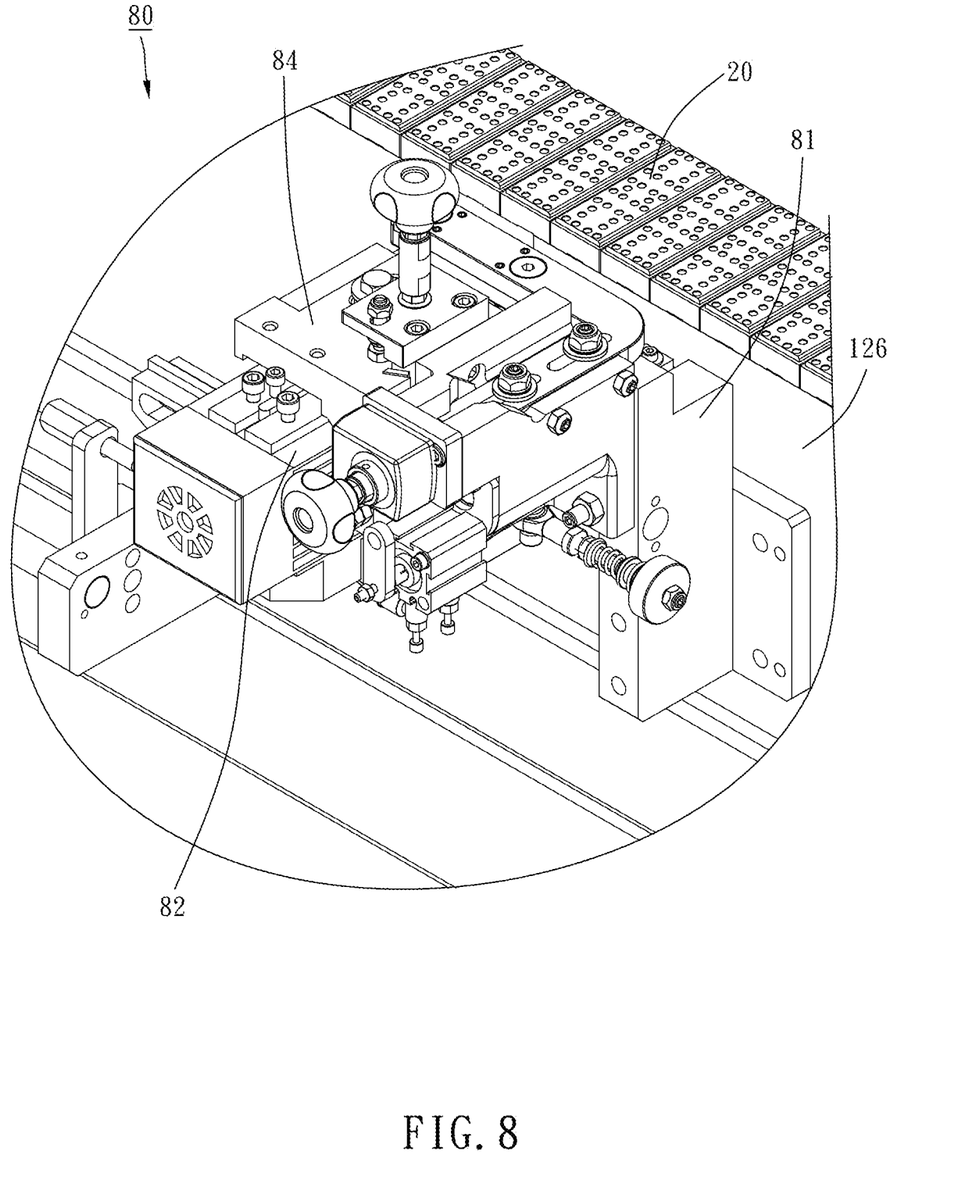

Referring to FIGS. 7 and 8, the bottom trimming mechanism 80 includes a third fixed rack 81, a second motor 82 and a trimming cutter 83. The bottom trimming mechanism 80 is located between the horizontal pressing wheel set 70 and the feed outlet end 122. The third fixed rack 81 is threadedly fastened to the second outer wall 126 by screws. The third fixed rack 81 has a top fixed plate 84. The second motor 82 is threadedly fastened to the top fixed plate 84. The second motor 82 has an outputting shaft 85. The trimming cutter 83 is rotatably disposed on the outputting shaft 85. The second motor 82 can drive the trimming cutter 83 to rotate and trim the workpiece W glued with the edge band B.

Referring to FIG. 9, the mechanisms of the edge banding machine 1, such as the pre-milling mechanism 40, the horizontal pressing wheel set 70 and the bottom trimming mechanism 80, are threadedly fastened to the second outer wall 126. In the condition that the width of the workpiece W is so large as to cause the workpiece W mostly protrude out of the slide rail 20 and the center of gravity G of the workpiece W located outside the slide rail 20, because each of the mechanisms are entirely fixed to the second outer wall 126 of the slide installation seat 12, even though the workpiece W together with the slide rail 20 and the slide installation seat 12 synchronously offset downward a little bit, the mechanisms fixed to the slide installation seat 12 will offset in the same direction with the slide rail 20 and the slide installation seat 12, so that the position of the workpiece W relative to each mechanism will remain unchanged. Therefore, the error of processing the workpiece W is reduced and the overall processing yield rate is increased.

The above-exemplified embodiment is given for clarifying the practically embodied configuration of the preferred embodiment of the present invention. The present invention is not limited to the above-exemplified embodiment. The modifications and variations within the spirit and scope disclosed in the present invention should be still included within the scope of the present invention.

What is claimed is:

1. An edge banding machine which is capable of reducing processing error and adapted for processing a workpiece, the edge banding machine comprising:
   a base having a slide installation seat, the slide installation seat having an first outer wall and an second outer wall which are arranged parallel to each other, the slide installation seat having a feed inlet end and a feed outlet end;
   a slide rail movably disposed on the slide installation seat from the feed inlet end to the feed outlet end;
   a positioning pressing wheel set being spacedly disposed above the slide rail and pressing the workpiece toward the slide rail in such a way that the workpiece can be moved between the slide rail and the positioning pressing wheel set and moved along with the slide rail;
   a pre-milling mechanism fixed to the second outer wall and located close to the feed inlet end and far from the feed outlet end.

2. The edge banding machine as claimed in claim 1, wherein the base comprises a bottom seat; the slide installation seat is disposed on the bottom seat; the bottom seat has a lateral surface which is flush with an outer surface of the first outer wall.

3. The edge banding machine as claimed in claim 1, wherein the slide installation seat is hollow-shaped and has an accommodating space; the slide installation seat further includes a top opening which communicates with the accommodating space.

4. The edge banding machine as claimed in claim 3, wherein the slide rail includes a plurality of bearing units; each of the bearing units bridges top sides of the second outer wall and the first outer wall.

5. The edge banding machine as claimed in claim 1, wherein the pre-milling mechanism includes a first fixed rack and a cutting wheel; the first fixed rack is fixed to the second outer wall; the cutting wheel is rotatably disposed on the first fixed rack.

6. The edge banding machine as claimed in claim 5, wherein the first fixed rack has a connecting plate and a fixed seat threadedly fastened to the connecting plate, and the cutting wheel is rotatably disposed on the fixed seat.

7. The edge banding machine as claimed in claim 6, wherein the cutting wheel has a rotary shaft; the pre-milling mechanism further includes a first motor and a transmission belt; the first motor has an outputting shaft; the transmission belt connects the rotary shaft of the cutting wheel and the outputting shaft of the first motor.

8. The edge banding machine as claimed in claim 1, further includes a horizontal pressing wheel set which includes a second fixed rack and a front horizontal pressing wheel; the second fixed rack is fixed to the second outer wall, and the front horizontal pressing wheel is rotatably disposed on the second fixed rack.

9. The edge banding machine as claimed in claim 8, wherein the horizontal pressing wheel set includes a rear horizontal pressing wheel and two fixed seats; the front and rear horizontal pressing wheels are rotatably disposed on the two fixed seats respectively; the two fixed seats are disposed on the second fixed rack.

10. The edge banding machine as claimed in claim 8, further includes a bottom trimming mechanism which includes a third fixed rack, a second motor and a trimming cutter; the bottom trimming mechanism is located between the horizontal pressing wheel set and the feed outlet end; the third fixed rack is fixed to the second outer wall; the second motor is fixed to the third fixed rack and has an outputting shaft; the trimming cutter is rotatably disposed on the outputting shaft.

* * * * *